United States Patent [19]

Hoheneder

[11] Patent Number: 5,739,248

[45] Date of Patent: Apr. 14, 1998

[54] COMPOSITION FOR THE PRODUCTION OF RADILY HARDENING AMINOSILANE CROSS-LINKING SILICONE MASSES

[75] Inventor: Rudolf Hoheneder, Traunstein, Germany

[73] Assignee: Heidelberger Baustofftechnik GmbH, Heidelberg, Germany

[21] Appl. No.: 732,438

[22] PCT Filed: Aug. 9, 1995

[86] PCT No.: PCT/EP95/03162

§ 371 Date: Nov. 5, 1996

§ 102(e) Date: Nov. 5, 1996

[87] PCT Pub. No.: WO96/07696

PCT Pub. Date: Mar. 14, 1996

[30] Foreign Application Priority Data

Sep. 3, 1994 [DE] Germany .............. 44 31 489.2

[51] Int. Cl.⁶ .............................................. C08G 77/26
[52] U.S. Cl. .................... 528/38; 528/901; 524/588; 524/837
[58] Field of Search .............. 528/901, 38; 524/588, 524/837

[56] References Cited

U.S. PATENT DOCUMENTS

| | | | |
|---|---|---|---|
| 4,462,828 | 7/1984 | Otsuki | 528/38 |
| 4,592,959 | 6/1986 | Wong | 428/450 |
| 4,593,085 | 6/1986 | Lucas | 528/901 |

*Primary Examiner*—Melvyn I. Marquis
*Attorney, Agent, or Firm*—Foley & Lardner

[57] ABSTRACT

A kit for the production of rapidly-hardening aminosilane cross-linking silicone masses including:

(A) 100 parts by weight of an at least bifunctionally terminated diorganopolysiloxane, which include a linear or branched chain of repeating units of the formula

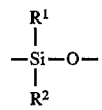

and which contains at least two end groups Z, wherein Z is —H, —OH, OR$^l$ or —SiR$^3$(NR$^4$R$^5$)$_2$, and R$^l$ and R$^2$ are independently a saturated or unsaturated hydrocarbon radical, optionally substituted with halogen or cyano groups, (B) 0.1 to 20 parts by weight of an aminosilane crosslinker of the general formula

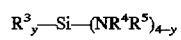

wherein y=0 or 1, R$^3$ is hydrogen or a monovalent saturated or unsaturated hydrocarbon or hydrocarbonoxy radical, and R$^4$ and R$^5$ are independently selected from hydrogen and saturated or unsaturated aliphatic, cycloaliphatic, or aromatic hydrocarbon radical with 1 to 15 carbon atoms, optionally substituted with halogen or cyano groups, (C) 0.1 to 20 parts by weight of an inorganic or organic compound capable of reacting with an amine to give salt formation (D) 0 to 20 parts by weight of water.

17 Claims, No Drawings

COMPOSITION FOR THE PRODUCTION OF RADILY HARDENING AMINOSILANE CROSS-LINKING SILICONE MASSES

The present invention concerns a kit for the production of rapidly hardening, aminosilane cross-linking silicone masses consisting of at least bi-functionally terminated diorganopolysiloxanes, aminosilane cross-linking agents, as well as possibly filling materials, suitable additives, pigments, colouring materials, oxidation-, heat- and light-protecting pigments, as well as solvents and plasticisers, as well as the use as adhesives or moulding materials.

Such organopolysiloxane mixtures, also known as cold-vulcanising, single component silicone rubbers, usually cross-link at room temperature with the take-up of water from the surrounding atmosphere to give rubber-elastic polymers. As chain lengtheners and cross-linkers, there are used bi- and higher functional aminosilane compounds which, by reaction with the polysiloxsne or by hydrolysis, split off amines and so initiate the formation of a macromolecular meshwork. After hardening has taken place, such masses are characterised by a good inherent adhesion on the most varied work material surfaces and by a generally high stability against the action of temperature, light, moisture, as well as chemicals.

The hardening of such single-component polysiloxane mixtures cross-linking at room temperature with the take-up of moisture takes place comparatively slowly since the water necessary for the reaction must diffuse into the interior of the mass in gaseous form from the surrounding atmosphere. Therefore, the speed of the hardening decreases with progressing reaction in the interior of the mass. In the case of low atmospheric humidity or in the case of an unfavourable ratio of surface to volume of the silicone mass, the reaction can become very slow or, as in moisture-tight closed spaces, can also come to a stop.

The per se diverse possibilities of use of such atmospheric moisture-hardening silicones as sealing or adhesive material are especially limited in the case of use for industrial purposes because of the slow hardening. Admittedly, two-component silicone rubber systems hardening rapidly at room temperature or hardening first at a higher temperature are known but the use thereof fails frequently because of the deficient inherent adhesion or also of the comparatively low temperature stability of these products. If, however, one uses silicones hardening only slowly under the influence of atmospheric moisture, in the case of short cycle times desired for economic reasons, large intermediate storages are necessary for the sealed-off or stuck parts in order to ensure the hardening. These intermediate storages must, in addition, possibly be climatised or moistened. Under certain circumstances, in this way, very large numbers of pieces are already produced before a testing for freedon from fault and function of the goods produced is first possible. Large-surface adhesions between diffusion-tight surfaces can, in practice, be carried out with atmospheric moisture-hardening silicones, such as the production of moulded bodies in closed moulds.

If one adds water in liquid form to the known aminosilane-containing and atmospheric moisture-hardening masses, in comparison with the cross-linking with atmospheric moisture a certain acceleration of the hardening is achieved. However, this form of the cross-linking does not lead to end products with material properties such as are obtained in the case of purely atmospheric moisture cross-linking. On the contrary, masses result which, in the long term, remain substantially softer, display poor inherent adhesion and are still swollen for a long time with the amine resulting as cross-linking cleavage product. The amine smell, generally found to be extremely unpleasant, is also maintained correspondingly long.

Similar results, thus only small hardening acceleration combined with comparatively poorer material properties and with long-lasting amine smell, are obtained when water is added in the form of salts containing water of crystallisation or also knowingly surface-moistened materials.

Thus, the task forming the basis of the invention consisted in making available sealing and adhesive masses based on aminosilane cross-linking polysiloxane mixtures, whereby, within a short time, i.e. within a few minutes up to several hours, these are to harden. Furthermore, the hardening is to be independent of the surrounding atmospheric moisture, i.e. it is also to take place in moisture-tight closed regions or moulds. The typical features of the hitherto known vulcanisates resulting in the case of atmospheric moisture cross-linking, such as for example inherent adhesion, mechanical properties and stabilities, are thereby to be substantially maintained.

The task forming the basis of the invention is solved by the features of the main claim and promoted by those of the subsidiary claims. Such mixtures are characterised in that they contain at least the following components;

A) 100 parts by weight of an at least bifunctionally terminated diorganopolysiloxane, whereby this is built up from a linear or branched chain of repeating units of the formula

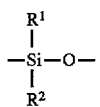

and—as illustrated in the following in the case of a linear chain—is terminated with functional end groups Z

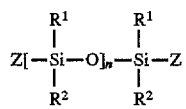

There hereby signify:

$R^1$, $R^2$: Saturated or unsaturated hydrocarbon radicals, possibly substituted with halogen or cyano groups Z: —H, —OH, $OR^1$ and $SiR^3(NR^4R^5)_2$ $R^3$: hydrogen or monovalent saturated or unsaturated hydrocarbon or hydrocarbonoxy radical with 1–15 carbon atoms $R^4$, $R^5$: hydrogen and/or saturated or unsaturated aliphatic, cycloaliphatic or aromatic hydrocarbon radicals with 1 to 15 carbon atoms, possibly substituted with halogen or cyano groups B) 0.1 to 20 parts by weight of an aminosilane cross-linker of the general formula

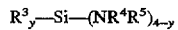

whereby y=0 and 1 and $R^3$, $R^4$ and $R^5$ have the above meaning.

C) 0.1 to 20 parts by weight of an inorganic or organic compound reacting with amines with salt formation D) 0 to 20 parts by weight of water.

As example for the radicals $R^1$ and $R^2$ of the component A are to be mentioned any desired saturated alkyl radicals, such as methyl, ethyl, n-propyl, iso-propyl, octyl, dodecyl, octadecyl, but also cyclic ones, such as cyclopentyl and cyclohexyl. Furthermore, unsaturated aliphatic and cycloaliphatic radicals, such as vinyl, allyl, cyclopentenyl or cyclohexenyl, and also aromatic ones, such as phenyl or naphthyl, and aliphatic-substituted aryl radicals, such as for example benzyl or toluyl, can be used. Within a polysiloxane, the radicals $R^1$ and $R^2$ can be of the same or different construction. It is also possible to mix branched and unbranched polysiloxanes of the above-described construction and in different chain length. Polysiloxanes terminated with hydroxyl groups, so-called α,Ω-dihydroxydiorganopoly-siloxanes with methyl and phenyl radicals, are preferably used.

The mentioned radicals can also be used in halogen- and cyano-substituted form. Examples herefor are 1,1,1-trifluorotoluyl, β-cyanoethyl or o-, m- or p-chlorophenyl radicals.

The viscosity of the diorganopolysiloxanes preferably lies in the range of 6000 to 350000 mPas.

In the component B, there can additionally be used compounds of the formula $$R^3{}_2\!-\!Si\!-\!(NR^4R^5)_2$$

These serve as chain lengtheners of the polysiloxanes used.

Besides hydrogen, the radical $R^3$ can be of the same construction as the radicals $R^1$ and $R^2$. Simple alkyl radicals, such as methyl or ethyl, are preferably used.

The radicals $R^4$ and $R^5$ can have the same construction as the radicals $R^1$, $R^2$ or $R^3$, whereby one of the two radicals can also consist of s hydrogen atom. Organoaminosilanes, which are to be obtained, for example, from reactions of methyltrichlorosilanes with primary, aliphatic or cycloaliphatic amines, especially with sec.-butylamine or cyclohexylamine, are preferably used.

As components C, there are suitable carboxylic and mineral acids, such as for example formic, acetic, citric, tartaric, oxalic, hydrochloric, sulphuric, phosphoric acid, and also acidic salts, such as for example the hydrogen phosphates and hydrogen sulphates of ammonium, alkali and alkaline earth metals, possibly also in combination. If these materials are used in a form containing water of crystallisation, in some cases the addition of component D to the mixture can be omitted. Preferably, therefore, the dihydrate of oxalic acid is, for example, used.

Component D can be added to the mixture not only in liquid form but also bound as water of crystallisation, for example as sodium sulphate decahydrate, or enclosed in zeolites and also adsorbed on the surface of filling materials, such as for example calcium carbonate. The addition of component D preferably takes place in combination with component C, bound as water of crystallisation in the dihydrate of oxalic acid.

To the mixtures of components A to D can be added further materials for the achievement of special properties. To be mentioned here are especially coloured pigments and soluble dyestuffs, stabilisers against oxidation and action of heat, dispersers, reaction catalysts, fungicides, adhesives, solvents, flame-protection agents, plasticisers (preferably silicone oils but also based on hydrocarbons), strengthening filling materials, such as for example highly dispersed or precipitated silicic acids, graphite, carbon black, as well as passive filling materials, such as e.g. calcium carbonate, silicates, quartz meal, glass and carbon fibres, diatomaceous earth, metal powder, metal oxides, synthetic material powder, as well as hollow spheroids of glass or synthetic materials.

Mixtures of the components A to D are not storage-stable. Therefore, the components C and D necessary for the reaction acceleration are admired in a suitable form with the mixture of the components A and B immediately before use, preferably pasted in silicone oils or polymers.

If the hardening of the mixtures of the components A to D takes place at elevated temperature, an additional acceleration of the cross-linking reaction is thereby achieved.

The present invention also concerns a process for the production of a sealing or adhesive mixture or moulding mass based on at least bifunctionally terminated diorganopolysiloxanes and aminosilane cross-linkers, which are characterised in that A) 100 parts by weight of such a diorganopolysiloxane, whereby this is built up from s linear or branched chain of repeating units of the formula $$\begin{array}{c} R^1 \\ | \\ -Si-O- \\ | \\ R^2 \end{array}$$

and is terminated, corresponding to the following formula concerning the special case of linear chains $$\begin{array}{cc} R^1 & R^1 \\ | & | \\ Z[-Si-O]_n-Si-Z \\ | & | \\ R^2 & R^2 \end{array}$$

with functional end groups Z, and whereby $R^1$, $R^2$: signify saturated or unsaturated hydrocarbon radicals, possibly substituted with halogen or cyano groups Z: —H, —OH, $OR^1$ and —$SiR^3(NR^4R^5)_2$ $R^3$: hydrogen or monovalent saturated or unsaturated hydrocarbon or hydrocarbonoxy radical $R^4$, $R^5$: hydrogen and/or saturated or unsaturated aliphatic, cycloaliphatic or aromatic hydrocarbon radical with 1 to 15 carbon atoms, possibly substituted with halogen or cyano groups, are mixed together with B) 0.1 to 20 parts by weight of an aminosilane cross-linker of the general formula $$R^3{}_y\!-\!Si\!-\!(NR^4R^5)_{4-y}$$

whereby y=0 and 1 and $R^3$, $R^4$ and $R^5$ have the above meaning, as well as possibly coloured pigments or soluble dye-stuffs, stabilisers against oxidation and action of heat, dispersers, reaction catalysts, fungicides, adhesives, solvents, flame-protection agents, plasticisers (preferably silicone oils but also plasticisers based on hydrocarbons), furthermore active, strengthening filling materials, such as for example highly dispersed or precipitated silicic acids, graphite, carbon black, as well as passive filling materials, such as e.g. calcium carbonate, silicates, quartz meal, glass and carbon fibres, diatomaceous earth, metal powder, metal oxides, synthetic material powder, as well as hollow spheroids of glass or synthetic material, and, immediately before use, C) 0.1 to 20 parts by weight of an inorganic or organic compound reacting with amines with salt formation and D) 0 to 20 parts by weight of water are added thereto.

The mixtures according to the invention themselves adhere to substrates of glass, ceramic, wood, concrete, plaster, metals and synthetic materials. Therefore, they are advantageously used as adhesive and sealing materials but are also suitable as protective coating for electrical insulation, as encapsulation masses for electrical and electronic constructional parts but also as moulding masses for the production of impressions or other moulded parts which are usefully produced from elastomers.

In the following, the invention is explained in more detail on the basis of examples.

EXAMPLE 1

100 parts by weight of a component I consisting of 100 parts by weight of an α,Ω-dihydroxydimethylpolysiloxane with a viscosity of 20,000 mPa.s, 8 parts by weight of an α,Ω-bis-(trimethylsilyl)-dimethyipolysiloxane with a viscosity of 100 mPa.s, 13 parts by weight of a highly dispersed silicic acid with a specific surface area according to BET of about 110 m$^2$/g 51 parts by weight of calcium carbonate filling material, 9 parts by weight of tris-(cyclohexylamino)-methylsilane are homogeneously mixed together at room temperature with 20 parts by weight of a component II consisting of 80 parts by weight of an α,Ω-bis-(trimethylsilyl)-dimethylpolysiloxane with a viscosity of 1000 mPs.s, 9 parts by weight of a highly dispersed silicic acid with a specific surface area according to BET of about 100 m$^2$/g, 10 parts by weight of an oxalic acid dihydrate with a grain fineness of <10 μm.

With the exclusion of atmospheric moisture, the mixture obtained from the components achieves at room temperature within 60 minutes a Shore-A hardness of 22°, whereas both components alone under these conditions remain storage-stable pastes.

If, in the above-described component II, one replaces the oxalic acid dihydrate by a 20% aqueous solution of sulphuric, hydrochloric or phosphoric acid, then, after mixing with the component I, the hardening through already takes place within a few minutes.

EXAMPLE 2

100 parts by weight each of a mixture consisting of 100 parts by weight of an α,Ω-dihydroxydimethylpolysiloxane with a viscosity of 80,000 mPa.s 41 parts by weight of an α,Ω-bis-(trimethylsilyl)-dimethylpolysiloxane with a viscosity of 100 mPa.s 6 parts by weight of a highly dispersed silicic acid with a specific surface area according to BET of about 150 m$^2$/g 123 parts by weight of a calcium carbonate filling material, 12 parts by weight of tris-(cyclohexylamino)-methylsilane are, for comparison, mixed at room temperature in one case with 2 parts by weight of finely crystalline oxalic acid dihydrate and in a further one with 0.6 parts by weight of water and stored with the exclusion of atmospheric moisture.

Already after three hours, the mixture with oxalic acid shows a Shore-A hardness of 13° Shore-A and shows a slight amine smell whereas the mixture only containing water, even after 24 hours, shows no measurable Shore-A hardness, is very soft and sticky and smells very strongly of amine.

I claim:

1. A kit for the production of a rapidly-hardening aminosilane cross-linking silicone mass comprising:

(A) 100 parts by weight of an at least bifunctionally terminated diorganopolysiloxane, which comprises a linear or branched chain of repeating units of the formula

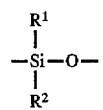

and which contains at least two end groups Z, wherein Z is independently —H, —OH, OR$^1$, or —SiR$^3$(NR$^4$R$^5$)$_2$, and R$^1$ and R$^2$ are independently a saturated or unsaturated hydrocarbon radical, optionally substituted with halogen or cyano groups, (B) 0.1 to 20 parts by weight of an aminosilane cross-linker of the formula

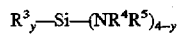

wherein y=0 or 1,

R$^3$ is hydrogen or a monovalent saturated or unsaturated hydrocarbon or hydrocarbonoxy radical, and R$^4$ and R$^5$ are independently selected from the group consisting of hydrogen and saturated or unsaturated aliphatic, cycloaliphatic, or aromatic hydrocarbon radical with 1 to 15 carbon atoms, optionally substituted with halogen or cyano groups, (C) 0.1 to 20 parts by weight of an inorganic or organic compound capable of reacting with an amine to give salt formation (D) 0 to 20 parts by weight of water.

2. A kit according to claim 1, wherein component (B) additionally contains one or more compounds of the formula

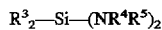

wherein R$^3$, R$^4$, and R$^5$ are as defined in claim 1.

3. A kit according to claim 1, wherein said inorganic or organic compound (C) comprises an organic or inorganic acid or a salt of an organic or inorganic acid.

4. A kit according to claim 1, wherein component (C) is contained in a form containing water of crystallization.

5. A kit according to claim 1, wherein component (D) is present and is added in liquid form, bound as water of crystallization, enclosed in zeolites, or adsorbed on the surface of filling materials.

6. A kit according to claim 1 further comprising in one of components A–D one or more of a colored pigment, soluble dyestuff, stabilizer against oxidation or heat, disperser, reaction catalyst, fungicide, adhesive, solvent, flame protection agent, plasticizer, active strengthening filling material, passive filling material, hollow spheroids of glass, or a synthetic material.

7. A kit according to claim 1, wherein component (A) comprises an α,Ω-dihydroxydiorganopolysiloxane.

8. A kit for the production of a rapidly-hardening aminosilane cross-linking silicone mass comprising:

(I) 100 parts by weight of an at least bifunctionally terminated diorganopolysiloxane, which comprises a linear or branched chain of repeating units of the formula

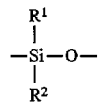

and which contains at least two end groups Z, wherein

Z is independently —H, —OH, OR$^1$, or —SiR$^3$(NR$^4$R$^5$)$_2$, and

R$^1$ and R$^2$ are independently a saturated or unsaturated hydrocarbon radical, optionally substituted with halogen or cyano groups, in admixture with 0.1 to 20 parts by weight of an aminosilane cross-linker of the formula $$R^3{}_y\text{—Si—}(NR^4R^5)_{4-y}$$

wherein y=0 or 1,

R$^3$ is hydrogen or a monovalent saturated or unsaturated hydrocarbon or hydrocarbonoxy radical, and R$^4$ and R$^5$ are independently selected from the group consisting of hydrogen and saturated or unsaturated aliphatic, cycloaliphatic, or aromatic hydrocarbon radical with 1 to 15 carbon atoms, optionally substituted with halogen or cyano groups; and (II) 0.1 to 20 parts by weight of an inorganic or organic compound capable of reacting with an amine to give salt formation in admixture with 0 to 20 parts by weight of water.

9. A process for the production of a sealing or adhesive mixture, comprising:

mixing the following components (A) and (B) to give a first pre-mixture, (A) 100 parts by weight of an at least bifunctionally terminated diorganopolysiloxane, comprising a linear or branched chain of repeating units of the formula $$\begin{array}{c} R^1 \\ | \\ -\text{Si}-\text{O}- \\ | \\ R^2 \end{array}$$

and contains at least two end groups Z, wherein Z is independently —H, —OH, OR$^1$, or —SiR$^3$(NR$^4$R$^5$)$_2$;

R$^1$ and R$^2$ are independently selected from saturated or unsaturated hydrocarbon radicals, optionally substituted with halogen or cyano groups;

(B) 0.1 to 20 parts by weight of an aminosilane cross-linker of the formula $$R^3{}_y\text{—Si—}(NR^4R^5)_{4-y}$$

wherein y=0 or 1;

R$^3$ is hydrogen or a monovalent saturated or unsaturated hydrocarbon or a hydrocarbonoxy radical;

R$^4$ and R$^5$ are independently selected from the group consisting of hydrogen and a saturated or unsaturated aliphatic, cycloaliphatic or aromatic hydrocarbon radical with 1 to 15 carbon atoms, optionally substituted with halogen or cyano groups;

and mixing the following components C and D to give a second pre-mixture, (C) 0.1 to 20 parts by weight of an inorganic or organic compound capable of reacting with an amine to give salt formation;

(D) 0 to 20 parts by weight of water, and the first and second premixtures are combined shortly before use to give an effective sealing and adhesive mixture.

10. The process according to claim 9, wherein to the first pre-mixture are further admixed one or more compounds of the formula $$R^3{}_2\text{—Si—}(NR^4R^5)_2$$

wherein R$^3$, R$^4$ and R$^5$ are defined as in claim 9.

11. A process according to claim 9 wherein component (C) comprises one or more organic or inorganic acids or acid salts thereof and, component (D) is present and comprises water of crystallization, hydrated materials, or water adsorbed on a zeolite or silica gel or filling material surface.

12. A process according to claim 9 wherein optionally added to component (C) or (D) or both (C) and (D), are one or more colored pigments, soluble dyestuffs, stabilizers against oxidation or heat, dispersers, reaction catalysts, fungicides, adhesives, solvents, flame protection agents, plasticizers, strengthening filling materials, silicone plasticizers, or diorganopolysiloxane plasticizers.

13. A process according to claim 9, wherein component (A) comprises an α,Ω-dihydroxydiorganopolysiloxane.

14. A method of coating a substrate comprising mixing the components of the kit of claim 1 to form a mixture and applying the mixture to the substrate.

15. A method of producing impressions or other molded parts comprising preparing a mixture from the kit of claim 1.

16. A substrate coated with a mixture of the components of the kit of claim 1.

17. A molding mass comprising a mixture of the components of the kit of claim 1.

* * * * *